H. E. SPIKER.
NUT BLANCHING MACHINE.
APPLICATION FILED MAR. 12, 1921.
1,387,562.
Patented Aug. 16, 1921.
3 SHEETS—SHEET 2.
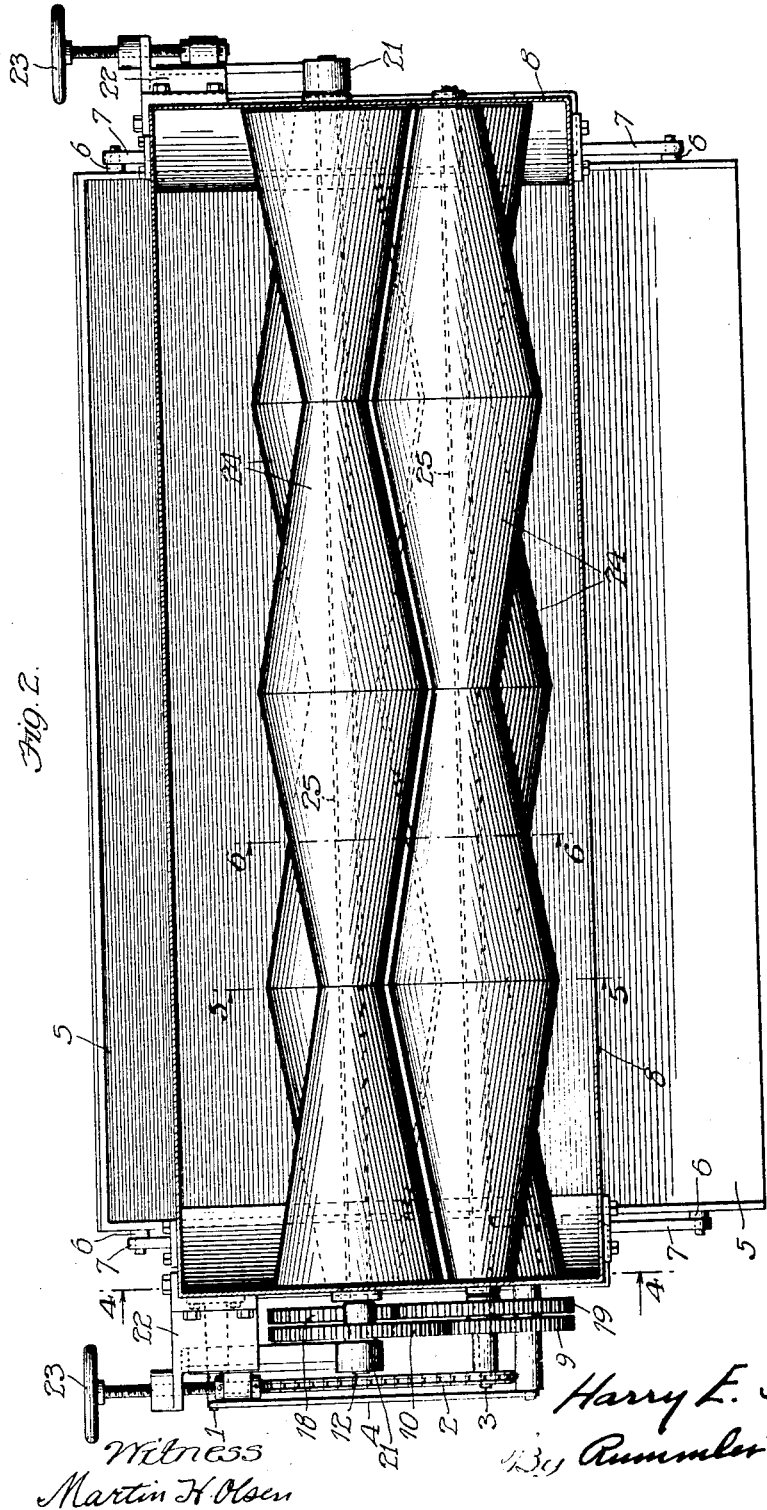

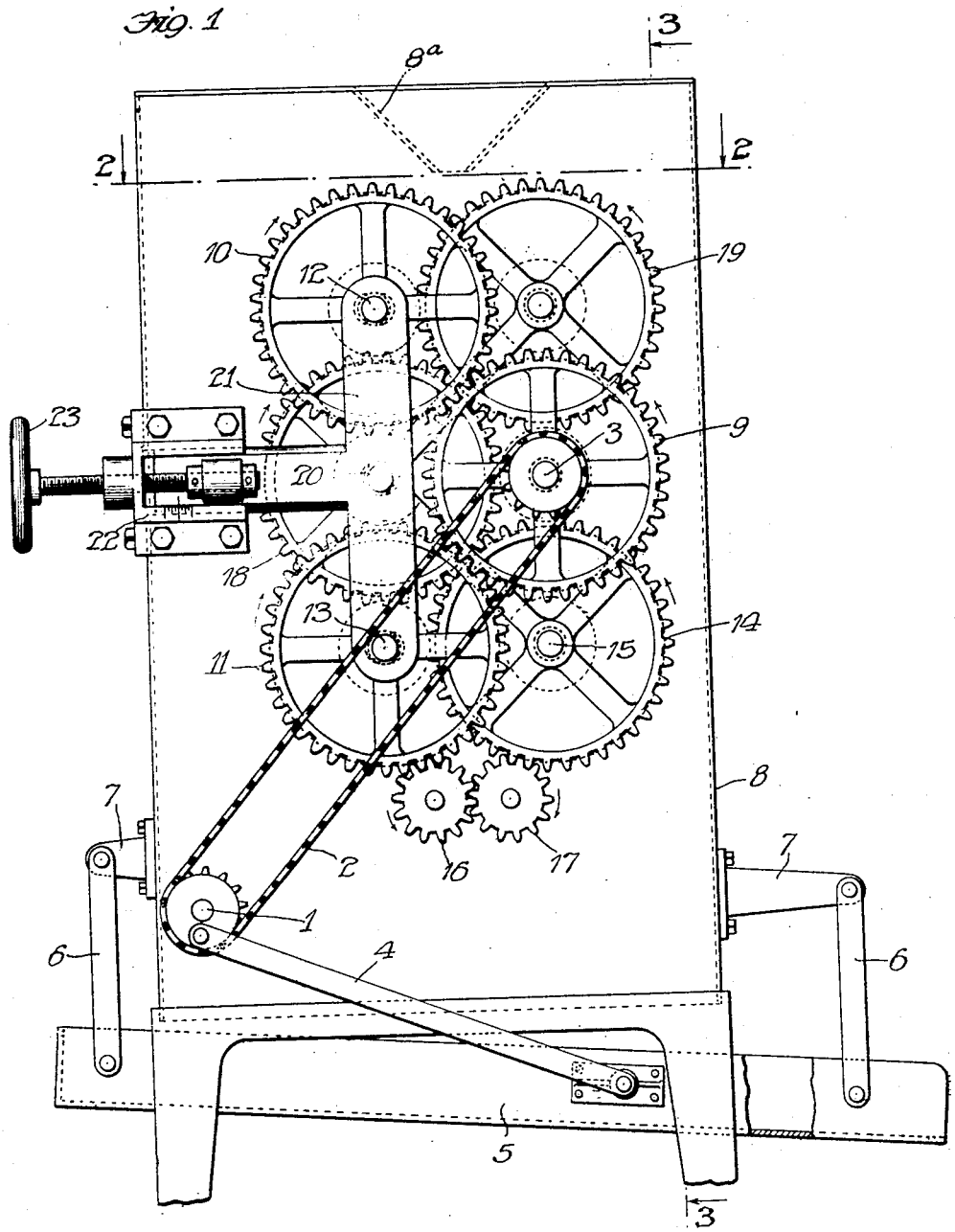

H. E. SPIKER.
NUT BLANCHING MACHINE.
APPLICATION FILED MAR. 12, 1921.
1,387,562.
Patented Aug. 16, 1921.
3 SHEETS—SHEET 3.
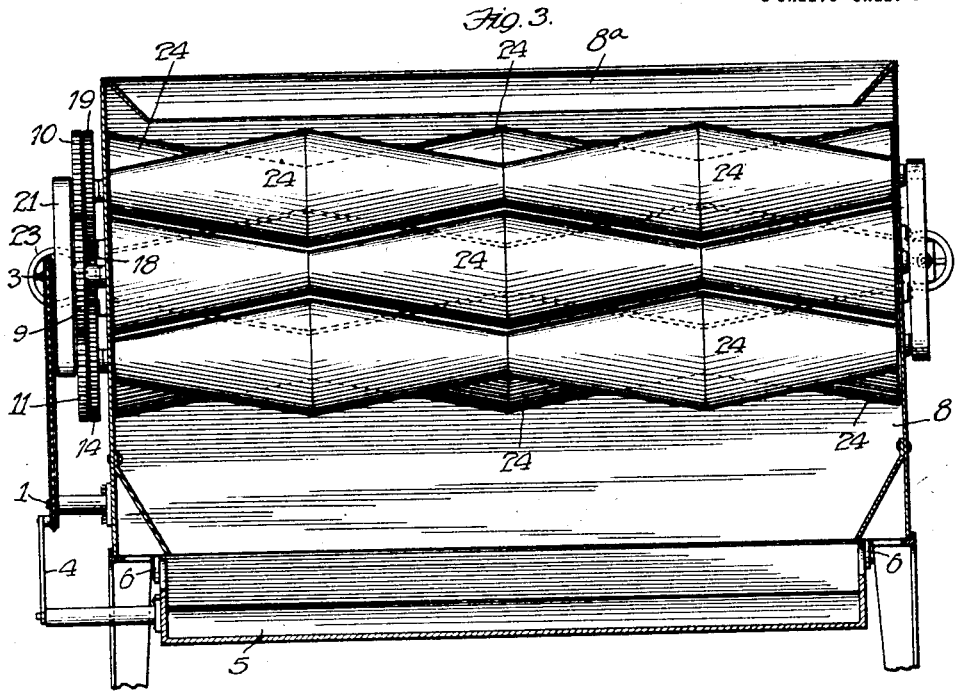
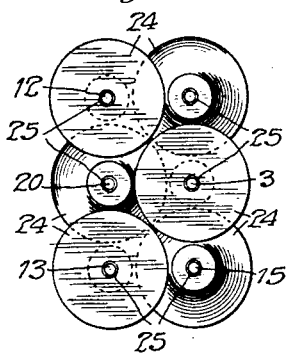
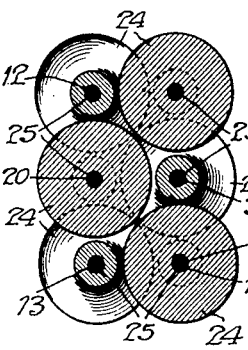
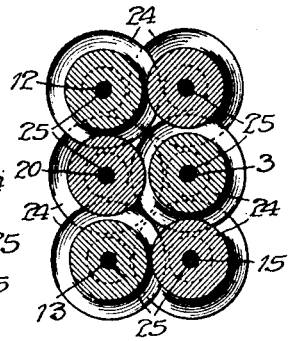
Witness
Martin H. Olsen.
Inventor
Harry E. Spiker
By Rummler & Rummler
Attys.

UNITED STATES PATENT OFFICE.

HARRY E. SPIKER, OF CHICAGO, ILLINOIS, ASSIGNOR, BY DIRECT AND MESNE ASSIGNMENTS, OF ONE-HALF TO JOHN W. CHAPMAN AND ONE-HALF TO WILLIAM H. BROWN, BOTH OF CHICAGO, ILLINOIS.

NUT-BLANCHING MACHINE.

1,387,562.      Specification of Letters Patent.     Patented Aug. 16, 1921.

Application filed March 12, 1921. Serial No. 451,906.

*To all whom it may concern:*

Be it known that I, HARRY E. SPIKER, a citizen of the United States of America, and a resident of Chicago, county of Cook, and State of Illinois, have invented certain new and useful Improvements in Nut-Blanching Machines, of which the following is a specification.

This invention relates to machines particularly adapted for removing the skins or inner envelops of almonds and other nuts and grains. The present design utilizes the principle disclosed in the patent to James G. Kennedy, No. 1,367,664, February 8, 1921, whereby a pair of driven coacting resilient members, between which the almonds are fed, are so formed as to provide relative graduated surface speeds for the purpose of producing a twisting and rubbing of the almonds quite similar to that naturally produced between the fingers when the skins are removed by hand. The purpose of the present invention is mainly to increase the capacity of machines of the type shown in the Kennedy patent. The objects of the invention are attained by the use of a plurality of coacting conical rollers, between which the almonds or other nuts are fed. These rollers are resilient so as not to injure the nuts and have suitable surfaces such as rubber to provide for the desired frictional action on the skins of the nuts.

The objects of the invention are accomplished by the device shown in the accompanying drawings, in which—

Figure 1 is an end view of a blanching machine constructed according to this invention.

Fig. 2 is a top plan view with the casing shown in section.

Fig. 3 is a view in side elevation and with the casing shown in section.

Fig. 4 is an end view of a set of the conical blanching rolls.

Fig. 5 is a sectional detail of the rolls taken on the line 5—5 of Fig. 2.

Fig. 6 is a sectional detail taken on the line 6—6 of Fig. 2.

In the use of this machine, the almonds are dipped in hot water for the purpose of softening the skins prior to passing the almonds between the skin-removing rolls. The mechanism employed consists of a considerable number of conical rubber rolls, each one of which is molded on a tube. These rolls are slipped on supporting shafts to which they may be frictionally secured or pinned. It is preferable to employ a plurality of such cone sections for each shaft with ends of like diameter abutting. The coacting rolls on adjacent shafts are oppositely arranged so that the large end of one cone comes opposite the small end of a cone on the opposite shaft. Thus, when the almonds pass between the cones on the two shafts they are subjected to a rubbing and twisting action due to the differences in peripheral speeds between adjacent parts of coacting cones and the graduated surface speed of each cone. As the almonds pass downwardly through the machine, they are successively acted upon by pairs of such coacting rolls to insure that practically all of the almonds are properly blanched. The almonds fall from between the cones to an inclined shaking tray along which they pass to a conveyer. The chaff is removed from the conveyer as the almonds pass from end to end of the same, by means of a suction apparatus as disclosed in the before-mentioned Kennedy patent. This suction apparatus is of sufficient strength to insure the carrying away of all of the almond skins, but is not strong enough to lift any of the almonds. It is customary for an operator to watch the almonds as they pass along the conveyer to remove any which have not been blanched by the machine.

Power is supplied to the machine through the motor shaft 1. A chain 2 transmits motion from this shaft to one of the roll supporting shafts 3, and a link 4 from the sprocket on shaft 1 imparts a shaking action to tray 5 which is suspended by links 6 from brackets 7 on the machine frame 8. Tray 5 receives the almonds after the same have been blanched. The almonds enter the machine through the hopper 8ª and from the hopper pass downwardly between the sets of blanching rolls. Each pair of coacting rolls is driven by a gearing shown in Figs. 1 and 2. Shaft 3 carries a gear 9 meshing with gears 10 and 11 on shafts 12 and 13. Gear 11 transmits motion to gear 14 on shaft 15 through the intermediates 16 and 17, one of which is double the normal width in order that gear 14 and the gears 18 and 19 driven thereby may be in a different plane than the gears 9, 10 and 11, and that the gears may overlap as shown in the drawings and thus permit the desired spacing of the roll carrying shafts. The gears are provided with rather long teeth in order that shafts 12, 20 and 13 may be shifted slightly to carry the rolls thereon toward and away from the coacting rolls on the remaining shafts and thus vary the space between the coacting rolls to accommodate nuts of different sizes. Shafts 12, 20 and 13 are for this purpose supported in bearings 21 which are slidable along the fixed guides 22 by means of wheels 23.

Each blanching roll comprises a plurality of rubber cones 24, each of which is carried by a tube 25 of like length. The entire set of cones or frusto-conical cones are alternately arranged on the supporting shafts as shown in the drawings in order to provide a compact structure and to provide for differences in surface speeds between adjacent parts of coacting cones. By this arrangement a single machine of any desired capacity may be provided, and even with the small number of cones shown in the illustration, there is considerable area provided along the coacting surfaces of the cones where the rubbing and twisting action on the nuts takes place.

In some classes of work it is necessary to change the material forming the surface of the rolls. For instance, in blanching peanuts, brush surfaced cones are employed.

In the operation of the machine, if employed for blanching almonds, the nuts are first dipped in hot water as usual and then fed through the hopper 8ª at the desired rate. From this hopper the nuts fall onto the rolls, and as their upper surfaces rotate toward each other and then downwardly at the closest point the nuts are caused to travel from one set of rolls to between the next. In traveling downwardly the nuts are slightly squeezed by the resilient rolls, and since at the points of contact with each nut the rolls are traveling at different surface speeds, not only relatively, but also in an axial direction, the desired rubbing and twisting action is imparted to the nuts.

Although but one specific embodiment of this invention is herein shown and described, it will be understood that numerous details of the construction shown may be altered or omitted without departing from the spirit of this invention as defined by the following claims.

I claim:

1. In a nut blanching machine, a pair of oppositely disposed coacting resilient cones, between which the nuts are fed for the purpose of removing skins therefrom.

2. In a nut blanching machine, a pair of oppositely disposed coacting resilient cones, between which the nuts are fed for the purpose of removing skins therefrom, and means for rotating the cones in opposite directions.

3. A nut blanching machine comprising coacting blanching rolls each of which consists of a plurality of frusto-conical sections, said sections being alternately arranged so that the large ends thereof are adjacent each other in the sections which are coaxial, and are adjacent the small ends of the sections on the opposed roll.

Signed at Chicago this 9th day of March, 1921.

HARRY E. SPIKER.